United States Patent [19]

Inaba et al.

[11] Patent Number: 4,691,213

[45] Date of Patent: Sep. 1, 1987

[54] ION GENERATING DEVICE AND METHOD OF MANUFACTURING SAME

[75] Inventors: Yutaka Inaba, Kawasaki; Yujiro Ando, Yokohama, both of Japan

[73] Assignee: Canon Kabushiki Kaisha, Tokyo, Japan

[21] Appl. No.: 941,553

[22] Filed: Dec. 11, 1986

Related U.S. Application Data

[63] Continuation of Ser. No. 711,180, Mar. 13, 1985, abandoned.

[30] Foreign Application Priority Data

Mar. 19, 1984 [JP] Japan .................................. 59-51034

[51] Int. Cl.[4] ........................ G01D 15/06; H01J 7/24; C23F 1/02

[52] U.S. Cl. ................................ 346/159; 346/153.1; 346/155; 156/634; 250/426

[58] Field of Search ..................... 346/153.1, 155, 157, 346/158, 159, 160; 250/426; 156/636, 634

[56] References Cited

U.S. PATENT DOCUMENTS

| | | | |
|---|---|---|---|
| 4,160,257 | 7/1979 | Carrish | 346/159 |
| 4,365,549 | 12/1982 | Fotland et al. | 346/159 X |
| 4,408,214 | 10/1983 | Fotland et al. | 346/159 |
| 4,409,604 | 10/1983 | Fotland | 346/159 |
| 4,415,403 | 11/1983 | Bakewell | 346/155 X |
| 4,558,334 | 12/1985 | Fotland | 346/159 |

*Primary Examiner*—E. A. Goldberg

*Assistant Examiner*—Linda M. Peco

*Attorney, Agent, or Firm*—Fitzpatrick, Cella, Harper & Scinto

[57] ABSTRACT

An ion generating device includes a plurality of first electrodes extending in a first direction; a plurality of second electrodes extending in the second direction which is different from the first direction, to constitute a matrix; a third electrode so disposed that the second electrodes lie between the first electrodes and the third electrode, the third electrode having apertures corresponding to the matrix; a first dielectric member disposed between the first electrodes and the second electrodes; a second dielectric member disposed between the second electrodes and third electrode, the second dielectric member having a plurality of apertures corresponding to the matrix, which apertures each have a cross-sectional area generally increasing toward the third electrode. A method of manufacturing the same including the steps of providing an assembly constituted by the first electrodes, the second electrodes and the first dielectric member interposed therebetween; bonding a dielectric sheet to the second electrodes and bonding a conductive sheet to the dielectric sheet; forming apertures corresponding to the matrix in the conductive sheet to form the third electrode; and etching the dielectric sheet with the conductive sheet having the apertures functioning as a resist to form apertures in the dielectric sheet to provide the second dielectric member.

13 Claims, 10 Drawing Figures

ION GENERATING DEVICE AND METHOD OF MANUFACTURING SAME

This application is a continuation of application Ser. No. 711,180 filed 3/13/85, now abandoned.

BACKGROUND OF THE INVENTION

The present invention relates to an ion generating device usable for an electrostatic recording or the like and a method of manufacturing the same.

It is known, as disclosed in U.S. Pat. No. 4,160,257, for example, that ions are generated at a high electric current density and are selectively extracted and applied onto an electrically chargeable member so as to charge the chargeable member (recording medium) with the shape of an image, which is used for an electrotatic printing or the like.

FIG. 1 is a cross-sectional view of a discharging device suitable for use in such a printing process. The device includes a plurality of first electrodes 11, a number of second electrodes 12 and a third electrode 13, arranged as shown in FIG. 1. First electrodes function as inducing electrodes 11 and each extend in a first direction. Second electrodes 12 function as discharging electrodes in the form of finger electrodes and each extend in a direction which is different from the first direction, somewhat perpendicular to the first direction so that a matrix is constituted by those first electrode 11 and second electrodes 12. Third electrode 13 is provided with a number of apertures corresponding to the matrix. First electrodes 11 and second electrodes 12 sandwich a first dielectric member 14. Also, second electrodes 12 and third electrode 13 sandwich a second dielectric member 15. The second dielectric member 15 has a number of apertures 16 corresponding to apertures 17 of third electrode 13. An AC voltage is applied between a selected first electrode 11 and a selected second electrode 12, whereby positive and negative ions are generated adjacent to the second electrode 12 at the cross-overpoint of the matrix determined by selected first electrode 11 and selected second electrode 12. Between second electrode 12 and third electrode 13, a bias voltage is applied so that only the ions that have the polarity determined by the polarity of the bias voltage are extracted out of the positive and negative ions generated. The extracted ions pass through aperture 16 of second dielectric member 15 and through aperture 17 of the third electrode 13 to electrically charge chargeable member (not shown) disposed opposed to the third electrode 13. By selectively driving the first electrodes 11 and second electrodes 12 in the manner described above, a dot-matrix electrostatic recording is performed.

The electrostatic recording using this process is advantageous. However, there is no good method of manufacturing a discharger, particularly for mounting second dielectric member 15 and third electrode 13 after first electrode 11, first dielectric member 14 and second electrodes 12 are assembled into a unit.

SUMMARY OF THE INVENTION

It would be considered, as a method of doing this, that second dielectric member 15 with apertures 16 and third electrode 13 with apertures 17 are manufactured as separate members, and then the former is aligned with and bonded to second electrode 12, whereafter third electrode 13 is aligned with and bonded to second dielectric member 15. However, there is a possibility that apertures 16 and the apertures 17 are clogged by the bonding agent or adhesive when they are bonded. Additionally, two fine alignment operations are required with the result of necessiating complicated manufacturing process.

The accuracy of the alignment of aperture 16 and aperture 17 with the crossoverpoints of the matrix, directly influence the quality of the image, and therefore, a method has been desired which can provide the discharging device wherein they are accurately aligned.

Further, the inventors have found that the ions having the polarity to be extracted are deposited on the inside surface of aperture 16 with the use of the device. These ions weaken the power of ion extraction so as to diminish the charging of the chargeable member.

Accordingly, it is a principle object of the present invention to provide a method wherein the alignment is highly accurate with a simple manufacturing process.

It is another principal object of the present invention to provide an ion generating device wherein the extraction power can be maintained at a high level.

These and other objects, features and advantages of the present invention will become more apparent upon a consideration of the following description of the preferred embodiments of the present invention taken in conjunction with the accompanying drawings.

DESCRIPTION OF THE PREFERRED EMBODIMENTS

Referring now to FIGS. 2A–2G, the manufacturing steps of the discharging device or ion generating device, according to an embodiment of the present invention, are illustrated.

Figure 1:
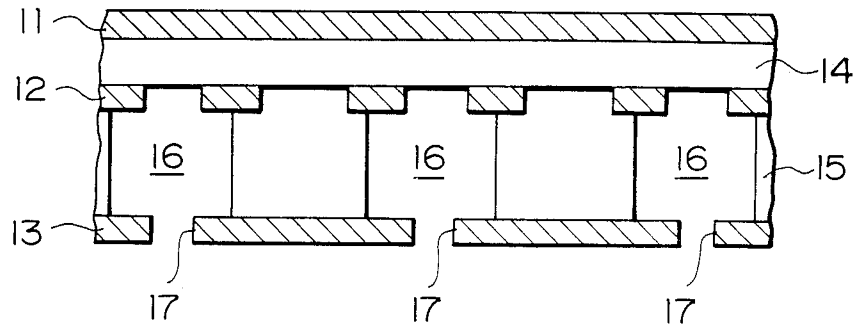
FIG. 1 is a cross-sectional view of an ion generator.
Figure 2A:
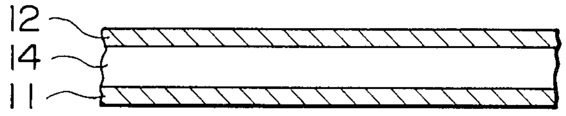
FIGS. 2A–2G illustrate an ion generating device manufacturing process according to an embodiment of the present invention.
Figure 2B:
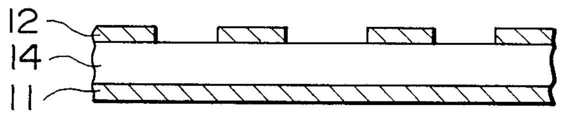

In FIG. 2A, foil-like metal sheets for the first electrode 11 and the second electrode 12 have been bonded to the opposite sides of the first dielectric member 14. FIG. 2B shows the state after the assembly shown in FIG. 2A has been subjected to a photo-lithography to form the sheets into the first electrodes 11 and the second electrodes 12, respectively. The method of manufacturing up to this point may be the same as that disclosed in U.S. Pat. No. 4,408,214. Briefly, an adhesive is applied to opposite sides of the first dielectric member in the form of a mica plate having a thickness of approximately 25 microns, and the foil sheets of stainless steel having a thickness of approximately 25 microns are bonded to the respective sides of the mica plate by pressing them to the mica plate by rubber rolls, and thereafter, patterns corresponding to the first and second electrodes are formed on the respective sides using photo-resist which exhibits a positive property with respect to photochemical reaction.

Figure 2C:
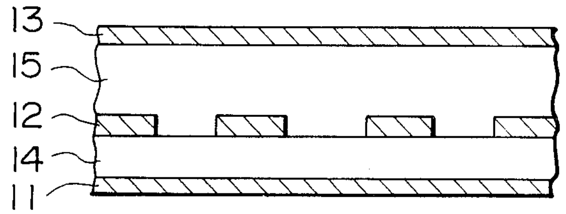

To the side of second electrode 12 side of the assembly shown in FIG. 2B, a laminated dielectric member, which will become second dielectric member 15, is bonded. The dielectric member is of, for example, a vinyl chloride resin, a polyurethane resin, a polyester resin or the like. It has a thickness of 50–300 microns, preferably 100–200 microns. During the bonding, a pressure of 10 kg/cm$^2$ is applied to dielectric member 15 toward second electrode 12, so that the dielectric member fills in the recessed portions between adjacent parts of the elements of second electrode 12 elements shown in FIG. 2B. To dielectric member 15, a conductive sheet in the form of foil of approximately 25 microns thickness is bonded with a cold-setting adhesive (urethane resin), for example, Takelac A606 (tradename) available from Takeda Yakuhin Kogyo Kabushiki Kaisha, Japan (FIG. 2C). The metal sheet may be of a stainless steel or gold. The metal sheet is subjected to a further processing to be third electrode 13.

Figure 2D:
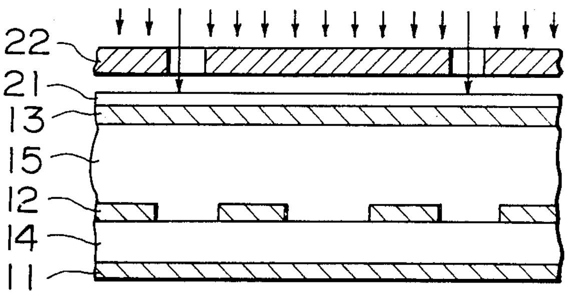

As shown in FIG. 2D, a photoresist 21 is applied to the outer surface of the metal sheet of electrode 13. The photoresist may be "AZ" (tradename) available from HOECHST, Japan. Then, a mask 22 is used for masking photoresist 21 except for such portions as will be apertures 17 of third electrode 13, and then photoresist 21 is subjected to illumination through mask 22, as shown in FIG. 2D. The openings of mask 22 are precisely aligned with the cross-over points of the matrix, i.e., the cross-over points between first electrodes 11 and the linear cavities existing between two finders of each of second (finger) electrodes 12. The description has been made with respect to the case where positive type photoresist 21 is used, but this is not limiting, and a negative type resist may be used which, for example, is "OMR" (tradename) available from Tokyo Ohka Kogyo Kabushiki Kaisha, Japan. In this case, however, mask 22 is such that it covers the portions which will be apertures 17 of third electrodes 13.

Figure 2E:
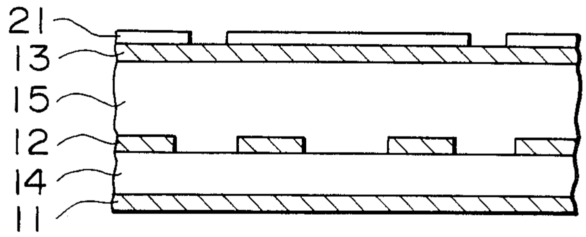

FIGS. 2E shows the assembly after the resist has been removed from the exposed portions thereof by a known method.

Figure 2F:
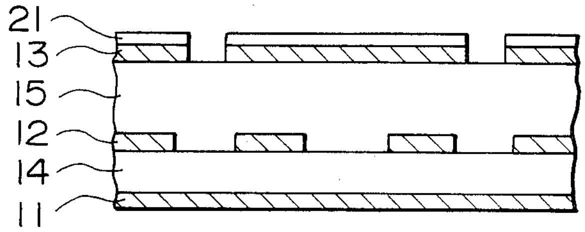

Then, the metal sheet or foil for electrode 13 is etched by dipping it into corrosive liquid, such as ferric chloride, phosphoric acid or the like to form apertures in metal sheet 19 (FIG. 2F). In this embodiment, the phosphoric acid was used, and the etching period was 30 minutes.

Figure 2G:
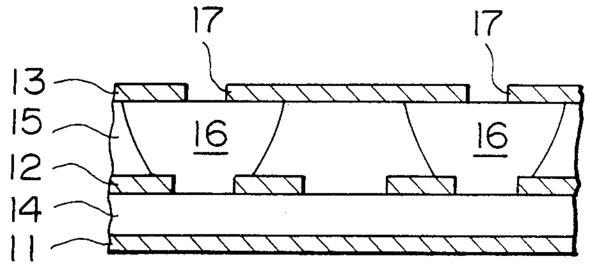

Further, the assembly is dipped into organic solvent, such as methyl ethyl ketone (MEK), aceton, dioxane, tetrahydrofuran or the like. Then, metal layer of electrode 13 functions as a resist so that only those portions of second dielectric member 15 which are adjacent to apertures 17, are removed, whereby independent apertures 16 are formed. Simultaneously, photoresist 21 is also removed. By suitably selecting the etching period, the apertures in shape as shown in FIG. 2G are formed, that is, each of apertures 16 of second dielectric member 15 has a cross-sectional area which increases toward third electrode 13.

The suitable etching period time was approximately 30 minutes, where the dielectric member for second dielectric member 15 was of a polyurethane resin having the thickness of 200 microns, to which third electrode 13 having an 80 microns diameter and apertures 17 were bonded, and it was etched by the MEK. During this etching action, the corrosion extended laterally by side etching, and the maximum of the side etching was approximately 100 microns. Since, the distance between adjacent apertures 16 was 200 microns, some adjacent apertures 16 could communicate with each other within a group of apertures for one finger electrode, that is, communicate with each other in the second direction along which finger electrodes 12 extend. But, it was confirmed that such communication did not have any adverse affect to the ion passing. Therefore, such an ion generating device is included in the scope of the present invention.

Figure 3:
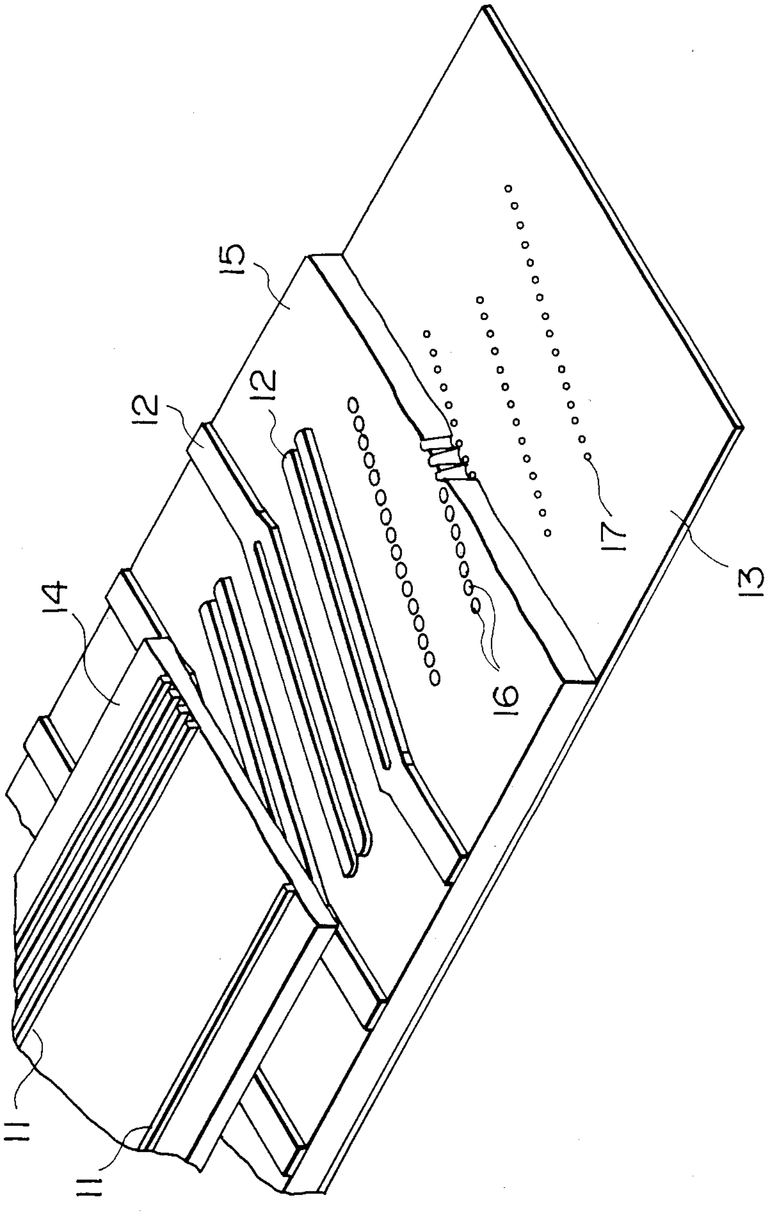
FIG. 3 is a perspective view, partly broken away, of the ion generating device according to an embodiment of the present invention.

FIG. 3 is a perspective view of the ion generating device manufacturing by the method according to the embodiment described above.

Description will be made with respect to the shape of aperture 16 of second dielectric member 15 after the manufacturing. As will be understood from FIG. 2G, the shape is such that the cross-sectional area of aperture 16 increases from opening or cavity of second electrode 12 toward the aperture 17 of third electrode 13. Ions having the polarity to be extracted of the positive and negative ions produced in the neighborhood of the surface of first dielectric member 14 at the cavity or aperture of second electrode 12 by the application of the alternating voltage, pass through apertures 16 and apertures 17 toward the chargeable member, recording medium (not shown). During this movement of the ions, the ions are partly deposited on the inner surface of aperture 16. Since the polarity of the ions thus deposited is the same as the polarity of the ions to be extracted, they tend to obstruct the extracting action of the ions. However, according to the present invention, aperture 16 has the cross-sectional area generally increasing toward aperture 17, as shown in FIG. 2G, and therefore, the obstruction is minimized to maintain a good extracting action.

This is because with the above structure it is difficult that the ions are deposited onto the inner surface of aperture 16, so that the obstruction to the flow of the ions to be extracted is much smaller.

A method according to another embodiment of the present invention will be described. This embodiment is similar to the first embodiment except for the etching process. That is, in this embodiment, the etching period of time is longer than in the first embodiment, whereby the cross-sectional area of aperture 16 is so large that apertures 16 are not independent from each other, but all communicate in the longitudinal direction of second electrode 12, that is, the finger electrode. Thus, it is formed as a slit. Slit-like apertures 16 are spaced by 1 mm in the longitudinal direction of the ion generating device (the first direction), but they are spaced by only 200 microns in the direction generally perpendicular thereto (the second direction), as is best shown in FIG. 3. Therefore, according to this embodiment, apertures 16 are still discrete in the longitudinal direction of the discharging device but are communicated in the direction generally perpendicular thereto. The etching period was 40–60 minutes. The period is so long that it could afford to ensure the corrosion in the direction of the depth of aperture 16. It was confirmed that the communication of apertures 16 did not have adverse affect to the extraction of the ions.

Figure 4:
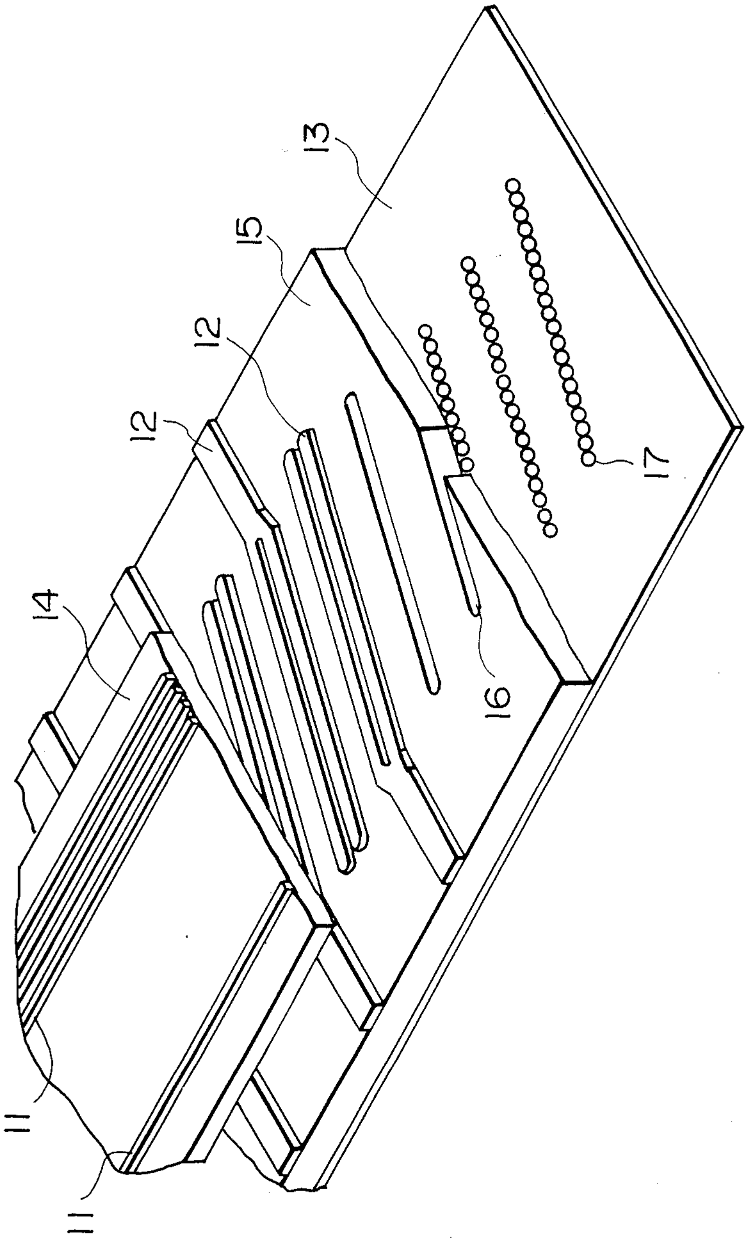
FIG. 4 is a perspective view, partly broken away, of the ion generating device manufactured by a method according to another embodiment of the present invention.

FIG. 4 is a perspective view of the ion generating device partly broken away. As shown, aperture 16 is provided corresponding to the individual lines of the matrix. Since the other portions of this discharging device is similar to the previous embodiment, and therefore, the detailed description to those portions are omitted for the sake of simplicity by assigning the same reference numerals to the corresponding parts.

As described in the foregoing, according to the method of the present invention, the number of alignment operations which require highly accurate alignment is reduced, and the alignment operation can be made accurate. Further, the manufacturing process is simplified, and the possibility of adhesive clogging the apertures can be avoided.

Further, the device according to the present invention is hardly influenced by the possibility of ions depositing on the inside of the apertures, so that the ion extracting action can be maintained stabilized.

While the invention has been described with reference to the structures disclosed herein, it is not confined to the details set forth and this application is intended to cover such modifications or changes as may come within the purposes of the improvements or the scope of the following claims.

What is claimed is:

1. An ion generating device, comprising:

a plurality of first electrodes extending in a first direction;

a plurality of second electrodes extending in a second direction which is different from said first direction, to constitute a matrix;

a third electrode so disposed that said second electrodes lie between said first electrodes and the third electrode, said third electrode having apertures corresponding to said matrix;

a first dielectric member disposed between said first electrodes and said second electrodes; and a second dielectric member disposed between said second electrodes and said third electrode, said second dielectric member having a plurality of apertures corresponding to the matrix, which apertures each have a cross-sectional area generally increasing toward said third electrode.

2. A device according to claim 1, wherein said plurality of apertures of said second dielectric member are formed corresponding to respective apertures of said third electrode.

3. A device according to claim 1, wherein said plurality of apertures of said second dielectric member are in communication in said second direction.

4. A device according to claim 2, wherein said plurality of apertures in said second dielectric member are independent from each other.

5. A device according to claim 3, wherein one communicated aperture of said second dielectric member is independent from said other communicated apertures thereof.

6. A method of manufacturing an ion generating device including a plurality of first electrodes extending in a first direction; a plurality of second electrodes extending in a second direction which is different from said first direction, to constitute a matrix; a third electrode so disposed that said second electrodes lie between said first electrodes and said third electrode, said third electrode having apertures corresponding to the matrix; a first dielectric member disposed between said first electrodes and said second electrodes; a second dielectric member disposed between said second electrodes and said third electrode, said second dielectric member having a plurality of apertures corresponding to the matrix, wherein an AC voltage is applicable between a selected first electrode and a selected second electrode, and a bias voltage is applicable between said second electrode and a third electrode, said method comprising the steps of:

providing an assembly constituted by said first electrodes, said second electrodes and said first dielectric member interposed therebetween;

bonding a dielectric sheet to said second electrode and bonding a conductive sheet to said dielectric sheet;

forming apertures corresponding to the matrix in the conductive sheet to form said third electrode; and using said third electrode as a resist to remove, by etching, parts of the dielectric sheet corresponding to the apertures of said third electrode to form apertures in the dielectric sheet to pass the ions by the bias voltage applied between said second electrode and said third electrode.

7. A method according to claim 6, wherein the step of forming apertures in said conductive sheet comprises applying a photoresist on the surface of said conductive sheet, exposing said photoresist selectively corresponding to apertures to be formed in said conductive sheet and etching said conductive sheet to form apertures corresponding to the exposure of said photoresist to light.

8. An apparatus according to claim 7, wherein said photoresist is a positive photoresist.

9. A method according to claim 7, wherein the photoresist is a negative photoresist.

10. An ion generating device comprising:

a plurality of first electrodes extending in a first direction;

a plurality of second electrodes extending in a second direction which is different from said first direction, to constitute a matrix;

a third electrode so disposed that said second electrodes lie between said first electrodes and said third electrode, said third electrode having apertures corresponding to the matrix;

a first dielectric member disposed between said first electrodes and said second electrodes; a second dielectric member disposed between said second electrodes and said third electrode, said second dielectric member having a plurality of apertures corresponding to said matrix;

first applying means for applying an AC voltage between a selected first electrode and a selected second electrode, a second applying means for applying a bias voltage between said selected second electrode and said third electrode;

wherein said plurality of apertures, through which ions generated adjacent to the second electrode at the crossover point of the matrix determined by said selected first electrode and said selected second electrode, have been formed using said third electrode as a resist to remove, by etching, parts of said second dielectric member to form said plurality of apertures corresponding to said apertures of said third electrode.

11. A device according to claim 10, wherein said apertures of said third electrodes are formed by etching.

12. A device according to claim 10, wherein each of said plurality of apertures has a cross-sectional area generally increasing toward said third electrode.

13. A device according to claim 1, wherein said ion generating device further comprising means for applying AC voltage between a selected first electrode and a selected second electrode, and means for applying a bias voltage between said selected second electrode and said third electrode.

* * * * *